United States Patent [19]

Niermann et al.

[11] 4,419,104
[45] Dec. 6, 1983

[54] PREPARING $P_2S_5$ OF LOW REACTIVITY

[75] Inventors: Hermann Niermann, Erftstadt; Günter Reichert, Bornheim-Merten; Hans Ebert, Erftstadt; Friedrich Neumann, Holzwickede, all of Fed. Rep. of Germany

[73] Assignee: Hoechst Aktiengesellschaft, Frankfurt, Fed. Rep. of Germany

[21] Appl. No.: 279,817

[22] Filed: Jul. 2, 1981

Related U.S. Application Data

[63] Continuation of Ser. No. 71,307, Aug. 30, 1979, abandoned.

[51] Int. Cl.$^3$ ............................................. C01B 25/14
[52] U.S. Cl. ................................. 23/293 R; 423/303
[58] Field of Search .......................... 23/293 R, 293 A; 423/303

[56] References Cited

U.S. PATENT DOCUMENTS

| 3,023,086 | 2/1962 | Robota | 423/303 |
| 3,146,069 | 8/1964 | Robota | 423/303 |
| 3,183,062 | 5/1965 | Taylor | 423/303 |
| 3,282,653 | 11/1966 | Robota | 422/245 |

FOREIGN PATENT DOCUMENTS 2838550  3/1980  Fed. Rep. of Germany.

Primary Examiner—Edward J. Meros
Assistant Examiner—Wayne A. Langel
Attorney, Agent, or Firm—Connolly & Hutz

[57] ABSTRACT

Phosphorus pentasulfide of low reactivity is made by solidifying molten phosphorus pentasulfide on a cooling cylinder that delivers the solidified product at a temperature of 150° to 220° C., and that product is immediately introduced into a heat-insulated container and freed therein from its immanent or sensible heat by cooling at a rate of at most 30° C. per hour without the expenditure of any energy to control the cooling.

2 Claims, 1 Drawing Figure

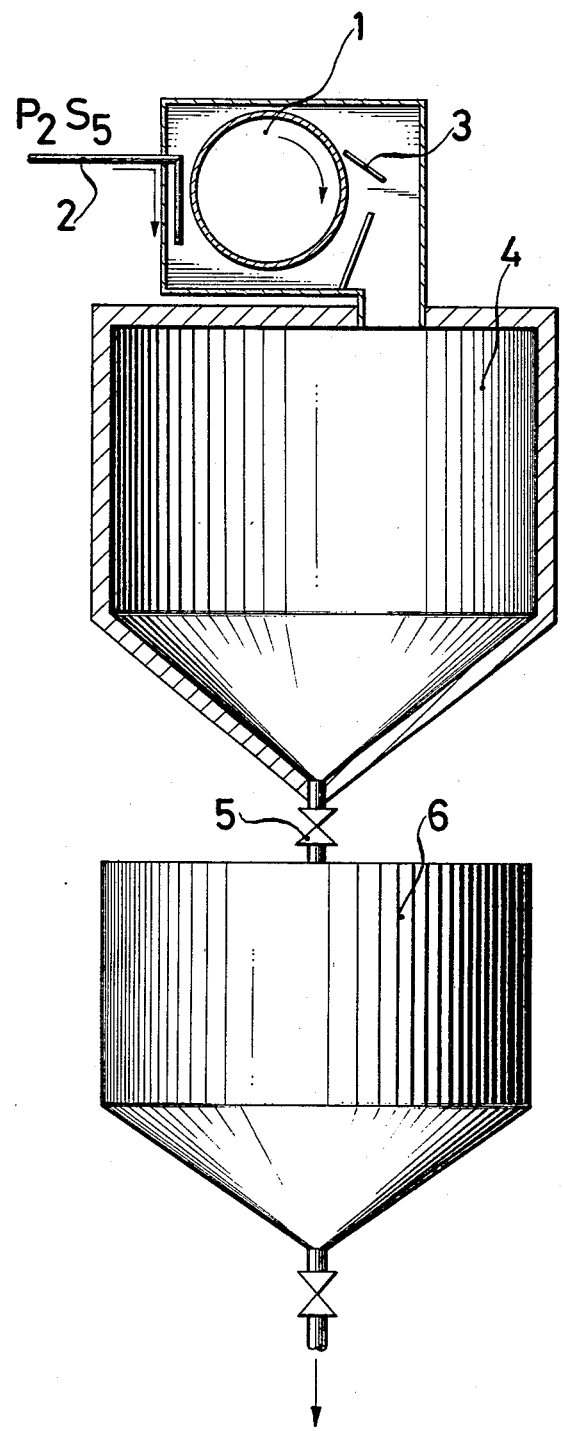

PREPARING P$_2$S$_5$ OF LOW REACTIVITY

This application is in part a continuation of application Ser. No. 71,307 filed Aug. 30, 1979, now abandoned.

The present invention relates to the making of low reactivity phosphorus pentasulfide (P$_2$S$_5$).

A feature of great importance in the processing of P$_2$S$_5$ is its "reactivity". An index of the reactivity of P$_2$S$_5$ is the reaction heat, expressed in °C./hour, which is set free during the reaction of P$_2$S$_5$ with an alcohol, e.g. 2-ethyl hexanol.

The various types of P$_2$S$_5$ can be classified as of high or low reactivity, respectively. High reactivity P$_2$S$_5$ is obtained by causing a P$_2$S$_5$ melt to solidify and then cool rapidly, and low reactivity P$_2$S$_5$ is obtained by allowing the melt to solidify and then delay the cooling.

In a plurality of processes, it is obligatory to use P$_2$S$_5$ having a reactivity that lies between that of highly reactive P$_2$S$_5$ and that of low-reactive P$_2$S$_5$. Various processes for making such P$_2$S$_5$ have already been disclosed in the art.

U.S. Pat. No. 3,146,069 discloses a process wherein highly reactive P$_2$S$_5$ is heated to various temperatures in the range of from 150° to 265° C. and annealed at such a temperature for different times. The reactivity of the resulting products decrease with increasing annealing temperatures and increasing annealing times.

U.S. Pat. Nos. 3,023,086 and 3,282,653 disclose processes wherein use is made of various coolants or cooling zones in which P$_2$S$_5$ is passed through the liquid-solid phase transformation interval from about 280° to about 260° C. for predetermined periods of time. P$_2$S$_5$ so made has a reactivity which is lower the longer the cooling period selected for passing through the above interval.

Another process has been described in U.S. Pat. No. 3,183,062, wherein solidified P$_2$S$_5$ is given a certain reactivity by maintaining the P$_2$S$_5$ over a sufficient period of time at a temperature between 190° C. and the melting point of P$_2$S$_5$, by means of a heating jacket.

It has now been found that the high reactivity which is typical of P$_2$S$_5$ solidified rapidly in a cooling device, e.g. on a cooling cylinder, can be reduced without the need to supply energy to the solidified P$_2$S$_5$ and without expensive machinery.

The present invention relates more particularly to a process for making phosphorus pentasulfide of low reactivity, wherein molten phosphorus pentasulfide is caused to solidify rapidly in a cooling zone, the rapidly solidified P$_2$S$_5$ coming from the cooling zone at a temperature of 150° to 220° C. is placed in a heat-insulated container, and abstracting therein the immanent heat by cooling for from one to four hours at a rate of at most 30° C. per hour.

After that slow cooling the product can be delivered to a reservoir which need not be thermally insulated from the ambient atmosphere, and allowed to cool therein down to temperatures of less than 65° C., then ground and packed. P$_2$S$_5$ which is so produced has a reactivity which is lower the lower the cooling velocity inside the heat-insulated container.

An apparatus for carrying out the present process is shown diagrammatically and by way of example in the accompanying drawing.

As can be seen, this is an apparatus of the kind wherein a device 1 for cooling molten P$_2$S$_5$, preferably a cooling cylinder, is provided with a line 2 supplying molten P$_2$S$_5$ to, and with a scraper 3 removing solidified P$_2$S$_5$ from, the surface of the cooling device 1. A sojourn tank 4 having walls of thermal insulation receives the scrapings and communicates via a lock 5 with a cooling reservoir 6 having its walls not thermally insulated and accordingly in good thermal contact with the ambient atmosphere.

The sojourn tank 4 can be a Dewar vessel, or its thermal insulation can be provided by linings applied to its walls.

Depending on the rate selected for cooling the phosphorus pentasulfide, use is made of a more or less effectively heat-insulated sojourn vessel 4.

The following Examples illustrate the invention. In the Examples, the reactivity was determined as the gradient or slope of the temperature/time straight line derived by placing 50 g of pulverulent 30° C. P$_2$S$_5$ in a calorimeter which had 100 g of 2-ethyl hexanol at 30° C. placed therein.

EXAMPLE 1: (Comparative Example)

By means of a scraper, scaly P$_2$S$_5$ at a temperature of 208° C. was removed from a melt-cooling cylinder, and the scraped material cooled down to about 80° C. in 2 hours in a customary tank, and then ground. The ground P$_2$S$_5$ had a reactivity of 47° C./hour.

EXAMPLE 2: (The present invention)

By means of a scraper, scaly P$_2$S$_5$ at a temperature of 207° C. was removed from a melt-cooling cylinder and placed for 2 hours in a Dewar vessel. At the end of that time the temperature had dropped to 160° C., and the P$_2$S$_5$ was then cooled in 1 hour down to 50° C. and pulverized. The pulverulent P$_2$S$_5$ had a reactivity of 12° C./hour.

EXAMPLE 3: (The present invention)

By means of a scraper, scaly P$_2$S$_5$ at 207° C. was removed from a melt-cooling cylinder and placed for 2 hours in a container heat insulated with thermal barrier plates. At the end of that time the temperature had dropped to about 150° C. Next, the resulting P$_2$S$_5$ was cooled down to 60° C. in 2 hours and ground. The ground P$_2$S$_5$ had a reactivity of 22° C./hour.

EXAMPLE 4: (The present invention)

By means of a scraper, scaly P$_2$S$_5$ at 167° C. was removed from a melt-cooling cylinder and placed for 2 hours in a Dewar vessel. At the end of that time the temperature had dropped to 110° C. Next, the resulting P$_2$S$_5$ was cooled down to 50° C. and pulverized. The pulverulent P$_2$S$_5$ had a reactivity of 26° C./hour.

EXAMPLE 5: (The present invention)

By means of a scraper, scaly P$_2$S$_5$ at 205° C. was removed from a melt-cooling cylinder and placed for 1 hour in a Dewar vessel. At the end of that time the temperature had dropped to 180° C. Next, the resulting P$_2$S$_5$ was cooled in 2 hours down to 60° C. and ground. The ground P$_2$S$_5$ had a reactivity of 15° C./hour.

EXAMPLE 6: (The present invention)

By means of a scraper, scaly P$_2$S$_5$ at 167° C. was removed from a melt-cooling cylinder and placed in a Dewar vessel for 4 hours. At the end of that time the temperature had dropped to 85° C. Next, the resulting $P_2S_5$ was cooled in 1 hour down to 50° C. and ground. The ground $P_2S_5$ had a reactivity of 23° C./hour.

The above-noted U.S. Pat. No. 3,023,086 contains a table of phosphorus pentasulfide reactivities measured by a modified technique. The reactivities of present Examples 1, 2 and 3 as measured by that modified technique, are 25%, 11% and 16%, respectively.

A feature of the present invention is that it is very simple to provide the insulated walls of the container in which the controlled cooling takes place. The temperature of the $P_2S_5$ in that container is not over 220° C., and at such temperature the $P_2S_5$ is not significantly reactive with materials such as polyethylene sheets and foams, ordinary wood, polystyrene and the like. The thermally insulated container of the present invention is accordingly inexpensive to construct and does not have the heating and cooling jacketing complexity of U.S. Pat. No. 3,183,062 for instance.

A further feature of the present invention is that it does not require the expenditure of energy to cool the $P_2S_5$ or to keep it from cooling too fast. The resulting conservation of expensive energy is an important commercial advantage.

The above-cited U.S. Pat. No. 3,146,069 mentions in its column 1, line 47, that under certain conditions the annealing operation it teaches can be effected without "reheating" the $P_2S_5$. However, reading that line in the context of the lines that precede and follow it, makes it clear that the patent's annealing always requires an arrangement for applying external heat to control the $P_2S_5$ temperature, but does not always require *increasing* the $P_2S_5$ temperature by *reheating*.

A still further feature of the present invention is that the 150°–220° C. cooling range is very much easier to control by insulation, than the high temperature annealing of the prior patents. Thus a 3-millimeter thick wall of unfoamed polyethylene, or a one-millimeter thick wall of polyethylene foam, provides all the insulation needed in accordance with the present invention.

Obviously many modifications and variations of the present invention are possible in the light of the above teachings. It is, therefore, to be understood that within the scope of the appended claims the invention may be practiced otherwise than as specifically described.

What is claimed:

1. In the process of preparing solid phosphorus pentasulfide of low reactivity from liquid phosphorus pentasulfide, the improvement comprising solidifying the liquid on a cooling cylinder to abruptly cool it to a temperature of 150°–220° C., immediately scraping the solidified material from the cooling cylinder and depositing the scrapings in a container having thermally insulated walls, without the application of external heat permitting the deposited scrapings to dissipate their heat content through those insulated walls at a rate that lowers their temperature not more than 30° C. per hour for between one and four hours to control the reactivity of the final product, and then more rapidly further cooling the thus-cooled scrapings to below 65° C.

2. The combination of claim 1 in which the cooling in the thermally insulated container is from about 207° C. to about 160° C., over a period of about 2 hours.

* * * * *